United States Patent [19]

Yung

[11] Patent Number: 5,154,734
[45] Date of Patent: Oct. 13, 1992

[54] POLLUTION CONTROL SYSTEM AND METHOD OF USING SAME

[75] Inventor: Shui-Chow Yung, Encinitas, Calif.

[73] Assignee: Calvert Environmental, Inc., San Diego, Calif.

[21] Appl. No.: 729,065

[22] Filed: Jul. 12, 1991

[51] Int. Cl.$^5$ .............. B01D 47/06; B01D 50/00; B03C 3/01

[52] U.S. Cl. .............................. 55/4; 55/8; 55/9; 55/20; 55/85; 55/89; 55/106; 55/122; 55/126; 55/135; 55/218; 55/226; 55/228; 55/258

[58] Field of Search ........................ 55/4, 7-13, 55/18, 20, 85, 89, 94, 106, 122, 124, 126, 134, 135, 210, 218, 223, 226, 228, 233, 240, 257.1, 257.2, 258

[56] References Cited

U.S. PATENT DOCUMENTS

| | | | |
|---|---|---|---|
| 3,485,012 | 12/1969 | Deussner | 55/9 X |
| 3,772,851 | 11/1973 | Duffey | 55/18 |
| 3,800,505 | 4/1974 | Tarves, Jr. | 55/11 X |
| 3,917,931 | 11/1975 | Sweeney, Jr. | 55/18 X |
| 4,152,123 | 5/1979 | Hegemann et al. | 55/85 |
| 4,305,909 | 12/1981 | Willett et al. | 55/94 X |
| 4,322,224 | 3/1982 | Roth | 55/20 |
| 4,401,444 | 8/1983 | Teller | 55/20 |
| 4,427,183 | 1/1984 | Hegemann et al. | 55/85 X |
| 4,427,420 | 1/1984 | Reid | 55/18 |
| 4,670,221 | 6/1987 | Marnet et al. | 55/18 X |
| 4,735,636 | 4/1988 | Roberts | 55/20 X |
| 4,781,732 | 11/1988 | Wondrasch et al. | 55/10 |
| 4,844,723 | 7/1989 | Tellini et al. | 55/106 |
| 4,964,885 | 10/1990 | Wieser-Linhart | 55/11 X |
| 5,032,154 | 7/1991 | Wright | 55/106 |

FOREIGN PATENT DOCUMENTS

| | | | |
|---|---|---|---|
| 54-002266 | 1/1979 | Japan | 55/18 |
| 54-033873 | 3/1979 | Japan | 55/18 |

*Primary Examiner*—Robert Spitzer
*Attorney, Agent, or Firm*—Bernard L. Kleinke; William Patrick Waters; Jerry R. Potts

[57] ABSTRACT

A pollution control apparatus, which monitors the amount of contaminants being removed from treated gas, and which adjusts parameters to maintain the contaminant removal amount within a preselected, desired range having maximum and minimum limits. A computing microprocessor, causes one or more parameters to be adjusted, thereby increasing or decreasing contaminant removal in order to maintain the level of removal within the preselected range.

23 Claims, 4 Drawing Sheets

POLLUTION CONTROL SYSTEM AND METHOD OF USING SAME

DESCRIPTION

1. Technical Field

The present invention relates in general to pollution control system and a method of using same for removing unwanted constituents from a fluid, such as waste gas. More particularly, the present invention relates to such a pollution control method and system, which are adapted to operate in a more effective and efficient manner.

2. Background Art

Throughout the industrialized world, various different industrial processes produce undesirably large quantities of waste fluids, such as waste gases containing contaminants. These contaminants can cause serious environmental, health and other hazards.

Suitable pollution control equipment has reduced greatly such undesirable effects in the environment. The hazardous aspects of such air pollution have been controlled by eliminating, or at least by reducing greatly, the contaminants at, or near the point of their generation. In this manner, by attacking the problem at its source, contaminants may be removed when they are at their greatest concentration.

Historically, contaminants issuing from smoke stacks have received early attention, often because the stacks have been readily visible and the plumes issuing from them have been easily observable. As a result, for many years, flue gas scrubbers have been utilized in an attempt to reduce particulates in waste gases exiting from furnaces and incinerators of various types and kinds.

It is well known that waste gas scrubbing systems require substantial amounts of energy, water and chemical reagents, for effective operation. In view of these factors, it would be highly desirable to have a waste gas treatment removal system which would be capable of reducing greatly the scrubber operational costs, while providing a more efficient and effective waste gas treatment system. Moreover, it has become important, especially in recent times, to conserve resources, such as energy and water. Thus, the scrubbers utilized today are employed for the express purpose of helping to prevent harm to the environment, but they are causing other harm unintentionally to the environment by the excessive utilization of natural resources.

As a general rule, both economic and environmental impact considerations are important. A point of diminishing returns can be reached at which the considerations of the consumption of energy, water and reagents, as well as the environmental impact, exceed the additional benefit which might otherwise be conferred by removal of pollutants entering the atmosphere.

In view of the foregoing, it would be highly desirable to have a pollution control system which can eliminate or greatly reduce contaminants entering the atmosphere in an environmentally suitable manner, while reducing overall system operating expenses. In this regard, such a new and improved system should operate in a more effective and efficient manner, so as to conserve natural resources being consumed by its operation.

DISCLOSURE OF INVENTION

It is an object of the present invention to provide a new and improved pollution control system, which reduces contaminants entering the atmosphere, while conserving natural resources, such as energy and water.

It is a still further object of the present invention to provide such a new and improved pollution control system and method capable of waste gas treatment in an economically cost effective manner.

Briefly, the above and further objects of the present invention are realized by providing a pollution control system, which monitors the amount of contaminants being removed from treated gas, and which adjusts parameters to maintain the contaminant removal amount within a preselected, desired range having maximum and minimum limits. A computing device, such as a microprocessor, causes one or more parameters to be adjusted, thereby increasing or decreasing contaminant removal in order to maintain the level of removal within the preselected range.

A significant advantage of the present invention is that contaminant removal can be monitored continuously and adjustments quickly accomplished automatically. The result is that water flow rates, reagent consumption and energy consumption can be reduced significantly, thereby reducing unwanted affects on the environment. At the same time, the inventive system and method are less expensive to operate, while maintaining contaminant removal levels within an acceptable, predetermined range.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

The following detailed description is organized according to the following outline:
A. GENERAL SYSTEM DESCRIPTION
B. DETAILED SYSTEM DESCRIPTION
B.1 CONDENSER/ABSORBER OPERATION
B.2 WATER DISTRIBUTION ARRANGEMENT
C. SYSTEM OPERATION
D. MICROPROCESSOR SOFTWARE

A. GENERAL SYSTEM DESCRIPTION

Figure 1:
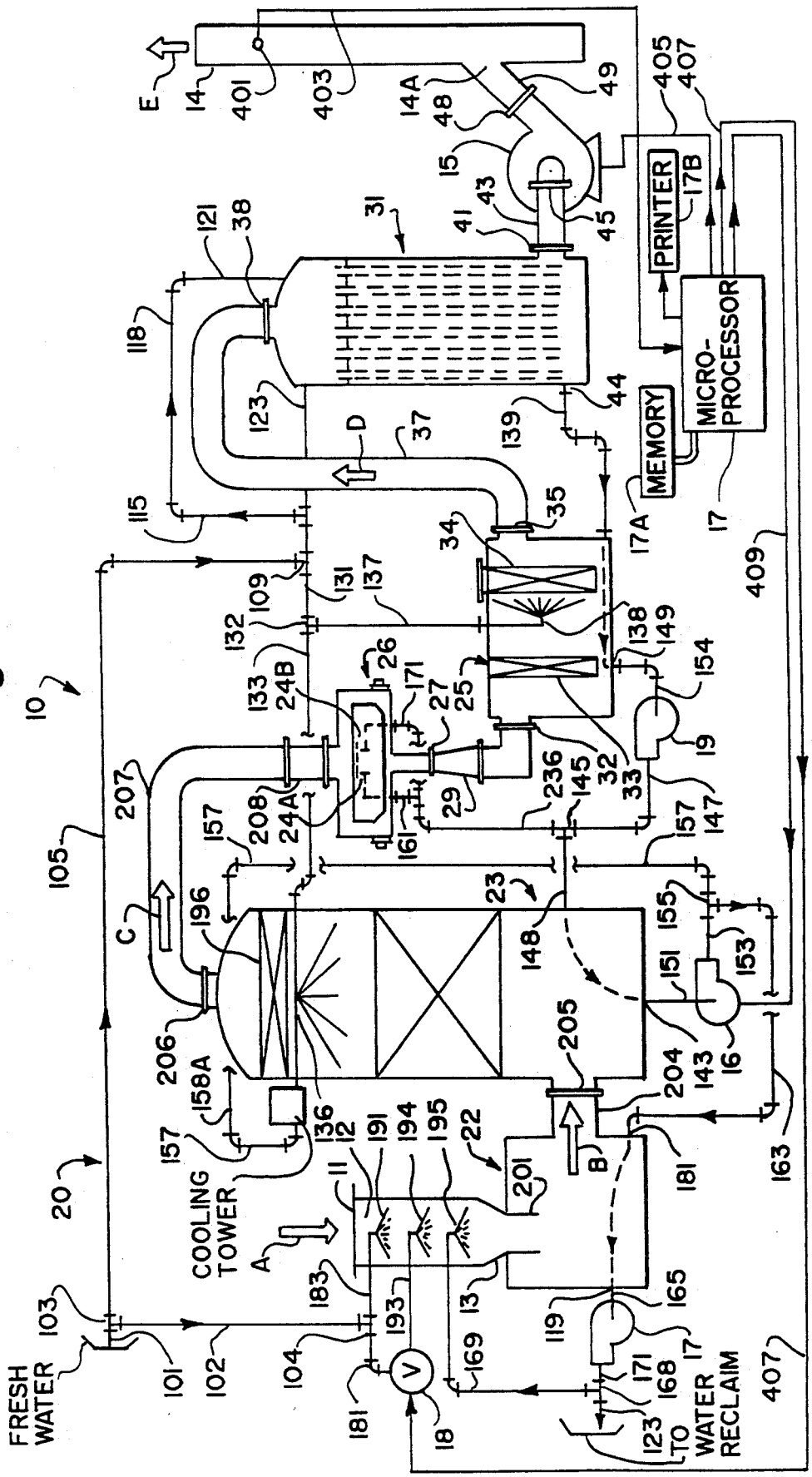
FIG. 1 is a diagrammatic view of a pollution control apparatus, which is constructed according to the present invention.

Referring now to the drawings, and more particularly to FIG. 1 thereof, there is shown a pollution control system 10, which is constructed in accordance with the present invention.

With reference now to FIG. 1, the system 10 generally comprises a quencher 22 which receives waste gas via a gas entry or inlet 11 to cool the waste gas. A condenser/absorber 23 treats the quenched waste gas, which flows therefrom to a scrubber 26 and an entrainment separator 25 for further treatment. A wet electrostatic precipitator 31 provides final processing before the waste gas is pumped into a stack 14 via a fan 15 to pass the resulting clean gas to the atmosphere.

A microprocessor 17 determines the amount of contaminants being removed from the waste gas, and controls certain system variables during the system operation to ensure that the contaminant removal level is maintained within preselected limits in accordance with the present invention.

As hereinafter explained in greater detail, the microprocessor 17 monitors the opacity of the discharged clean gas by means of a sensor 401 at the outlet of the stack, to determine the amount of particle in the gas being discharged to the atmosphere. If the particle removal is inadequate (the opacity of the gas is too dense), the microprocessor causes increased particle removal either by increasing the applied voltage to the electrostatic precipitator 31, increasing the scrubber pressure drop, and/or a pump 16 to deliver larger quantities of cold water to the condenser/absorber 23 for increased cooling. If the particle concentration is much lower than the predetermined level, the microprocessor causes either a decrease in applied voltage, a decrease in scrubber pressure drop, or water rate to the condenser/absorber.

When the particle concentration is too low, resources such as water, electrical power and chemical reagents are wasted. In this regard, there is a point of diminishing returns, beyond which the expenditure of valuable resources is not worth the small additional incremental gain in particle removal. Thus, according to the present invention, the amount of particle removal is precisely and continuously adjusted to maintain such particle removal amount within predetermined limits.

Figure 2:
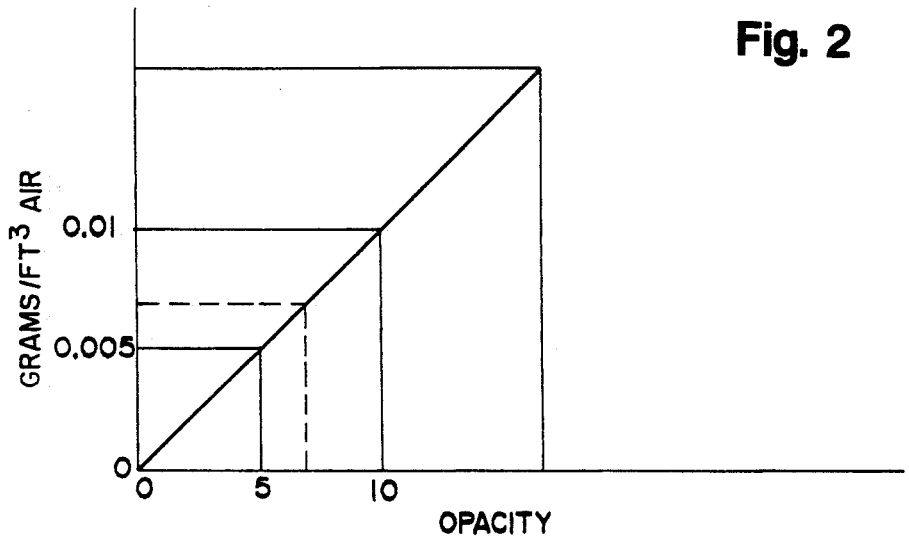
FIG. 2 is a graph useful in understanding the operation of the apparatus of FIG. 1.

Referring now to FIG. 2, as indicated graphically, a generally accepted maximum level of particulates in a waste gas is 0.01 gr/ft$_3$. FIG. 2 is a graphic representation of the 0.01 gr/ft$_3$ limit of particulates in smoke stack air, plotted against degrees of relative opacity of the smoke stack air. It will be noted that, in order to keep the contaminant level in the smoke stack air within the predetermined limits, the degree of opacity should not exceed a predetermined relative value, such as ten percent. A predetermined relative value of 5 is the lower limit below which resources are wasted in comparison to the small gain in particle removal.

It will be understood that the closer either value gets to zero, along either the abscissa, or the ordinate, the greater is the amount of energy and other resource consumption required. As a result, the desired system performance, after balancing system requirements with environmental and economic considerations, is to maintain the waste contaminant level within the 5-10 percent range, while avoiding the unwanted waste of resources by operating at a level below value 5. Thus, as indicated by the broken lines, maximum economy and efficiency are achieved when the system is operating within the desired relative opacity range of 5-10.

The system 10 of FIG. 1, is a wet scrubber system, designed to take advantage of water vapor condensation effects to enhance fine particle, heavy metal and acid gas removal. When a hot and saturated gas is in contact with cold water or a cold solid surface, condensation of water vapor occurs. Part of the vapor is condensed on the particles that serve as condensation nuclei. Thus, the particles grow in mass because of the layer of water the particles carry. Because of this growth, the particles are more susceptible to collection by inertial impaction.

As vapor condenses, the vapor drags particles with it as it moves toward the cold surface. This is termed "sweep diffusion." To a lesser extent, particle collection is also enhanced by thermal forces resulting from a temperature gradient between the gas undergoing treatment and cold surfaces. The diffusion and thermal forces are termed "flux" forces.

Particle growth by condensation, in combination with sweep diffusion and thermophoresis is termed "flux force/condensation scrubbing." This form of scrubbing enhances fine particle removal efficiency thereby providing a means for reducing air pollution control costs. The methods are applicable in situations where the gas undergoing treatment is high in moisture or high in temperature, or both.

Particle removal in the system 10 generally involves two operational stages. The first is particle enlargement by condensation of water vapor onto particles. The second stage is removal of the enlarged particles in the scrubber. It has been learned through experiments on scrubber systems that the removal efficiency of submicron particles is directly related to the amount of water vapor condensed. In turn, the amount of water vapor available for condensation is related to the saturation temperature of the gas stream before condensation and it increases in a non-liner fashion with temperature.

B. DETAILED SYSTEM DESCRIPTION

Considering now the system 10 in greater detail, with reference to FIG. 1, the waste gas, indicated at A, enters the quencher 22 at the gas entry or inlet 11 where the gas is saturated with water delivered into an initial treatment zone 12 through nozzles 191 and 194. Saturated gas then passes at 13 through a throat 201 into the interior of the quencher 22.

A quencher outlet 203 is connected through a conduit 204 to an inlet 205 at the bottom of the condenser/absorber 23. The flow of the quenched gas from the quencher 22 to the condenser/absorber 23 is generally indicated by the arrow B.

In the condenser/absorber 23, acid gas removal is accomplished. In this regard, the quenched gas is cooled to remove the majority of the acid gasses and approximately 30% of the particles therefrom. A spray nozzle 136 at the upper portion of a tower or chamber 196 saturates the quenched gas with water. An outlet 206 at the top of the tower 196 permits the waste gas to exit the condenser/absorber 22. A conduit 207 permits the exiting gas to flow at C through an inlet 208 into the collision scrubber 26.

In the collision scrubber 26, a pair of opposed nozzles 24A and 24B cause a pair of spray patterns directed at one another to produce a finely atomized aqueous mist. At this stage of the waste gas treatment, final acid gas and particle removal are accomplished.

A collision scrubber outlet 27 is connected to a conduit 29 for permitting the gas to flow from the collision scrubber 26, into an inlet 32 of the side of the entrainment separator 25.

The system treatment water includes recycled water, which typically contains between about 5% and about 10% by weight of total solids. Thus, a few liquid drops penetrating the entrainment separator can cause the scrubber system to be out of compliance with waste gas treatment standards. Therefore, in order for the entrainment separator to be utilized to remove any remaining water droplets, an inlet baffle 33 is disposed near the inlet 32. A spray nozzle 138 delivers a spray of fresh water toward an outlet baffle 34 to wash the baffles to keep them clean. After treatment in the entrainment separator 25, the gas flows at D, out of an outlet 35, through a conduit 37 and into an inlet 38 at the top of the electrostatic precipitator 31.

After the gas is treated in the wet electrostatic precipitator 31, an outlet 41 conveys the gas through a conduit 43 into an inlet 45 of the fan or pump 15. The fan 15 drives the treated air through a fan outlet 48 and a conduit 49 into an opening 14A in the stack 14 from whence the treated gas E is vented to the atmosphere.

B.1 CONDENSER/ABSORBER OPERATION

Figure 4:
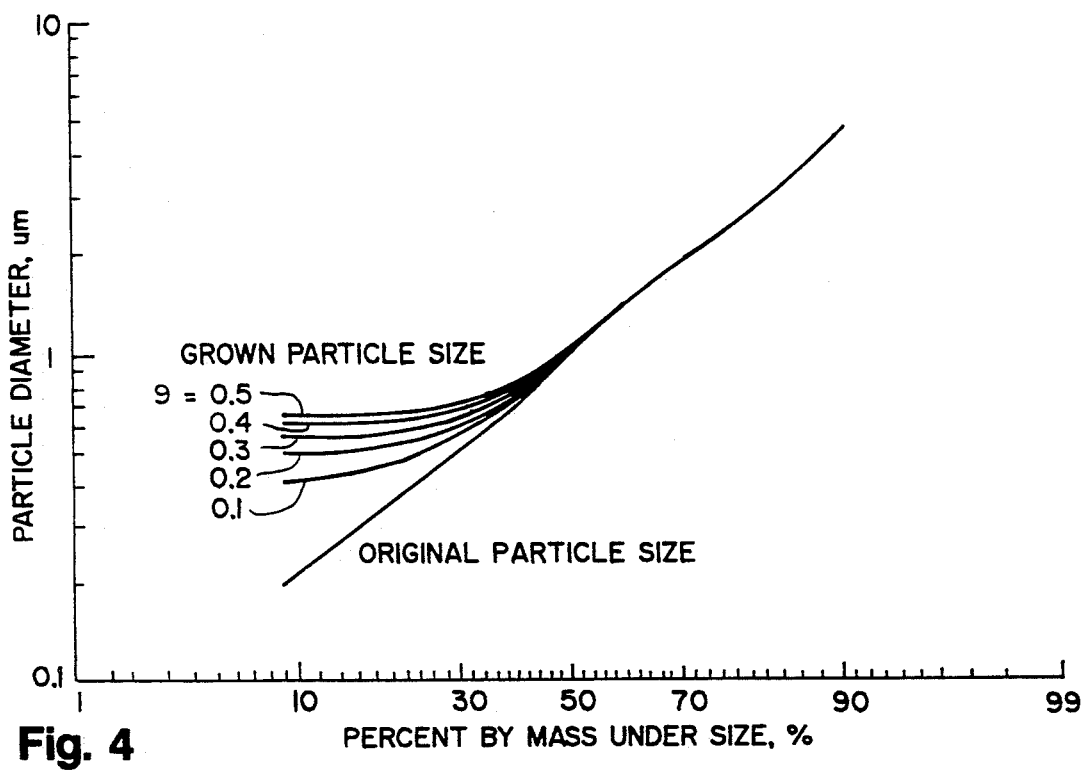
FIGS. 4, 5, 6 and 7 are graphs useful in understanding the present invention.

Considering now the operation of the condenser/absorber 23 of the system 10 in greater detail, FIG. 4 depicts a typical size distribution of particles from a hazardous waste incinerator producing the waste gas entering the system at A, together with several "grown" size distributions. The parameter "q" shown in FIG. 4 is the condensation ratio, in pounds of water vapor condensed per pound of dry non-condensing gas. As shown, submicron particles have grown substantially while large particles remain at the same size and the grown size increases as the condensation ratio increases.

Figure 5:
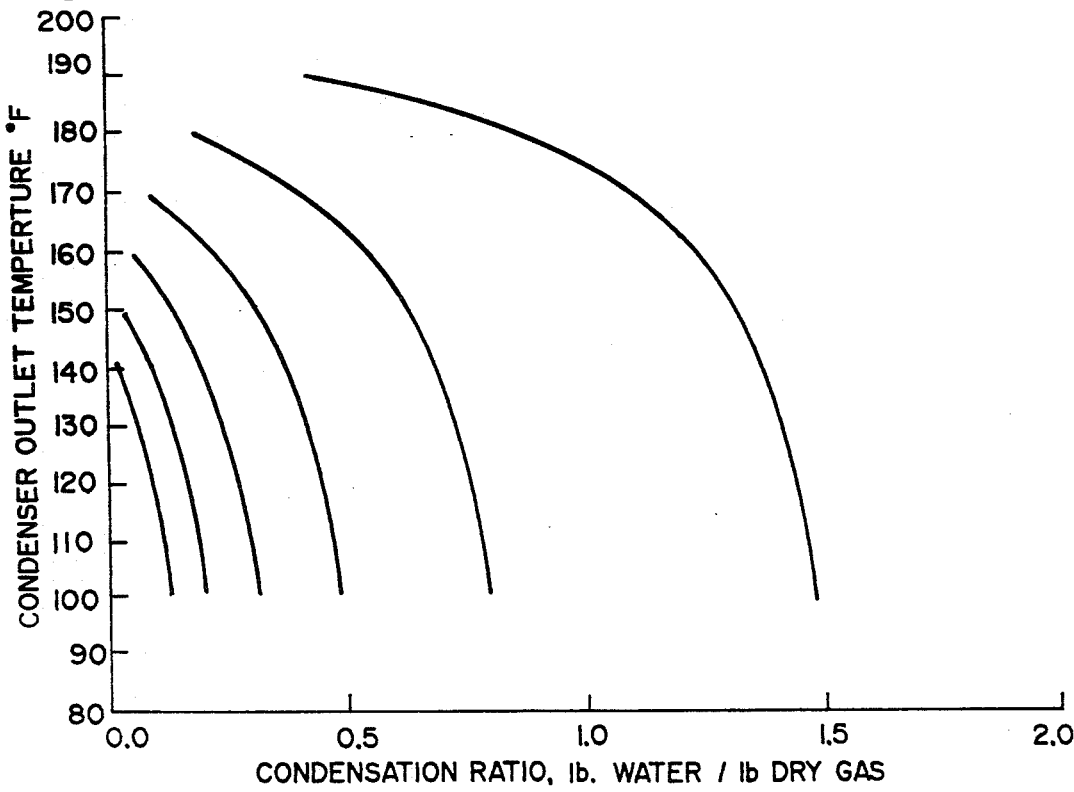

FIG. 5 depicts condensation ratio as a function of the inlet and outlet gas temperature of the condenser/absorber 23. Experimental data revealed that an effective scrubber system requires a minimum condensation ratio of 0.25 pounds of vapor condensed per pound of dry gas. This means the saturation temperature at the condenser/absorber inlet 205 should be higher than 145° F. to provide sufficient water vapor for condensation scrubbing.

Figure 6:
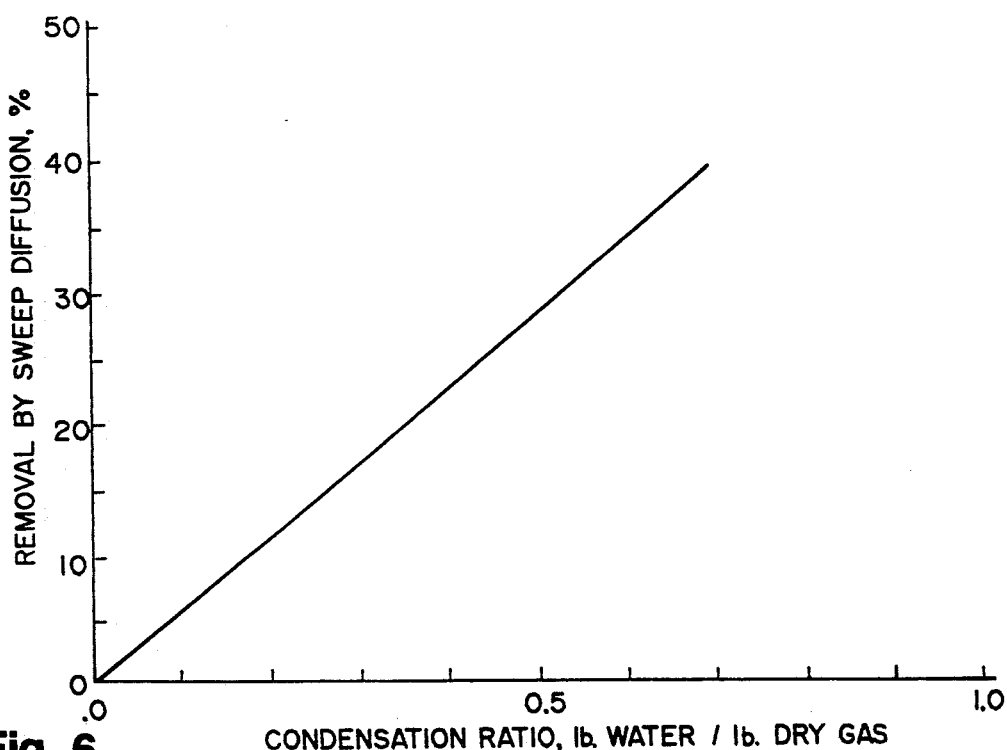

In addition to growing the particles, the condenser/absorber 23 also removes particles by sweep diffusion. As shown in FIG. 6, as the condensation ratio increases, the removal efficiency increases. A system performance curve can be constructed for a specific installation based on the known scrubber efficiency as a function of pressure drop, as indicated in FIGS. 4 through 6.

Figure 7:
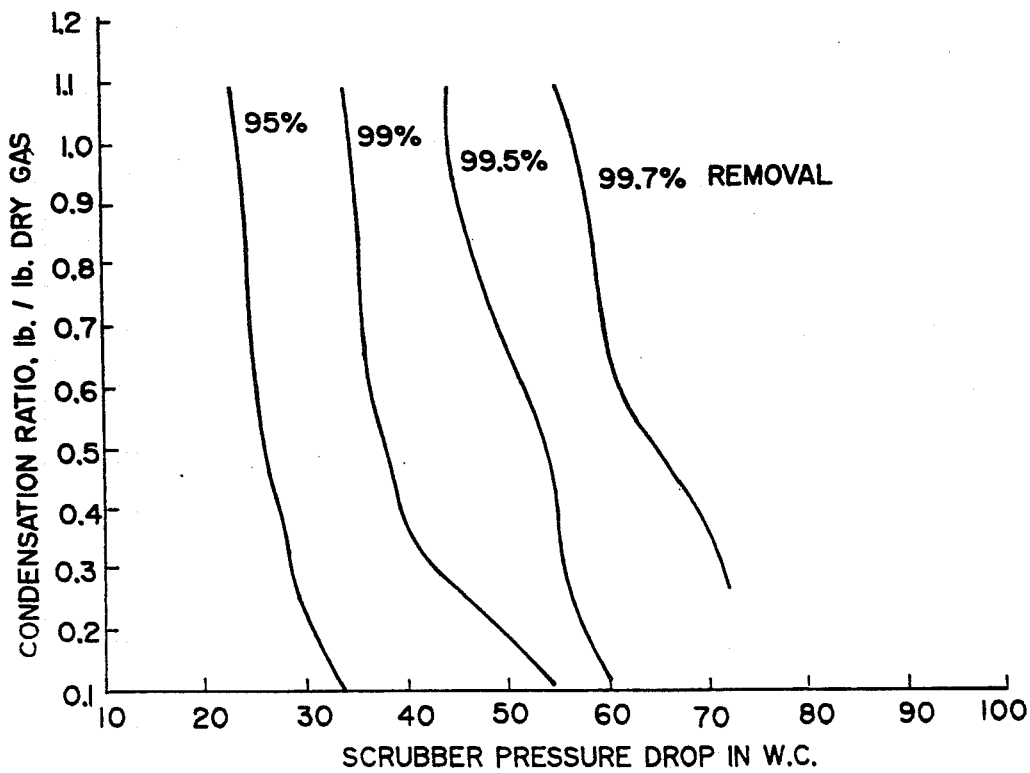

FIG. 7 shows an example of actual system performance curves for a scrubber system for a hazardous waste incinerator.

B.2 WATER DISTRIBUTION ARRANGEMENT

Considering now the water distribution arrangement generally indicated at 20 of the present invention in greater detail, with reference to FIG. 1, a conduit 101 via a tee 103 delivers fresh water to the system 10 from a source of water under pressure (not shown). Generally, the water is used in the system 10 to both treat the gas, as well as serve as a vehicle to remove particles separated from the gas.

A conduit 102 connected between the tee 103 and another tee 104 to a conduit 183, delivers water to the spray nozzle 191. A conduit 181 connects the tee 104 through a valve 18, and a conduit 193 to a nozzle 194 for relieving an emergency condition, as hereinafter described in greater detail.

Another conduit 105 carries water from the tee 103 through a tee 109 to a conduit 123 into the electrostatic precipitator 31. Water is flowed from the conduit 123 through a conduit 115, thence to a conduit 118 and finally, to a conduit 121 from which the water id delivered into the electrostatic precipitator 31. In addition, water may pass through the tee 109, through a conduit 131, through another tee 132 and a conduit 133 to the spray nozzle 136 in the condenser/absorber 23. Further, a conduit 137 connected to the tee 132, delivers water under pressure to the spray nozzle 138 intermittently, within the entrainment separator.

Under the control of the microprocessor 17, the pump 16 discharges recycle water through a conduit 157, which supplies water to the spray nozzle 136 via a cooling tower 158A to control the supply of cold water to the condenser/absorber 23. In this regard, the quantity of water flowing from the nozzle 136 is controlled via the control valve on line 157 and the microprocessor 17, to adjust selectively the temperature of the gas at the condenser/absorber 23 outlet.

In order to dispose of separated particles, waste water is pumped from an outlet 144, near the bottom of the precipitator 31, through a conduit 139 into the entrainment separator 25, to remove particles from the precipitator 31 and transfer them to the separator 25. Combined waste water produced by both the entrainment separator 25 and the precipitator 31 flow from a separator outlet 149 through a conduit 154 and into the inlet of a pump 19. A conduit 147 connected to the pump outlet discharges the combined waste water through a tee 145, a conduit 236 is connected with conduits 161 and 171 for delivery of a major portion of the water to the collision nozzles 24A and 24B, respectively within the scrubber 26 for scrubbing the gas flowing therethrough. A conduit 148 connected to the tee 145 or delivery of the remaining quantity of water into the bottom portion of the condenser/absorber 23 where the admitted waste water combines with waste water from the condenser/absorber and flows therefrom through an outlet 143, through a conduit 151, and into the inlet of the pump 16.

The pump 16 pumps the combined waste water, under pressure, through a conduit 153 and a tee 155 and through the conduit 157 to the cooling tower 158A before the water enters the nozzle 136.

Additionally, water exits the tee 155 through a conduit 163, for delivery through an inlet 181 into the bottom of the quencher 22 for removal of particles therefrom. The water thus delivered mixes with other waste water in the quencher 22, and is pumped from outlet 119 via a conduit 165, by a pump 17.

In order to dispose of the combined water, under pressure, a conduit 171 is connected between the outlet of the pump 17 and a tee 168 and a conduit 123 to discharge the waste water from the system 10 to a water reclamation collector (not shown) for reclaiming at least a portion of the system waste water, for recycling back to the system 10 via the conduit 101. Also, the water flows through a conduit 169 for delivery within the treatment zone 11 of the quencher, to the spray nozzle 195.

C. SYSTEM OPERATION

Operation of the system 10 is controlled by the microprocessor 17, which can periodically report its progress by a printer 17B and can document for the operator what adjustments have been made. Thus, a record of the performance of the system 10 can be provided, to help in local or remote troubleshooting of the system.

The microprocessor 17 operates by making process adjustments based upon key system outlet parameters. In a preferred form of the invention, the selected parameter is plume opacity, as measured in the stack 14.

At a specified time interval, which may vary from one second to many hours, the microprocessor 17 receives a stack plume opacity indicating signal via lead 403, from the stack opacity monitor or sensor 401. The monitor 401 measures the light transmittance which can be converted to a measurement of plume opacity. A design set point initially stored in the memory 17A of the microprocessor 17, is compared with the stack opacity indicating signal. If the opacity sensor fails to provide a signal, the algorithm of the microprocessor program defaults to a given system outlet stack opacity. The microprocessor 17 sends a printed message to the printer 17B noting the default and noting the shift to the default setting, so that a report to that effect, is produced by the printer 17B.

If the opacity is above the design set point, such as a relative value of 10% as shown in FIG. 2, the microprocessor 17 causes additional cold water to flow to the condenser/absorber 23 to cause greater quantities of particles to be removed by the system 10, and thus to cause the stack opacity to be less dense. The microprocessor 17 calculates the existing differential and compares that to the maximum differential available as represented in broken lines on the graph of FIG. 2.

If further cooling of the gas is possible within the condenser/absorber, the microprocessor 17 stores the condenser/absorber water limit as determined by the position of the positioner in the control valve, and then calculates whether or not further condenser/absorber cooling is possible.

If the result of the calculation is that the condenser/absorber outlet temperature can be lowered, a signal is sent to the control valve to increase the liquid rate to the condenser/absorber 23 and a report is sent to the microprocessor memory 17A indicating the action taken. The microprocessor 17 then sets a new condenser/absorber outlet temperature lower by a differential amount such as 5° F. than the initial temperature and goes into a monitoring mode.

At the preprogrammed interval, the microprocessor 17 rechecks the stack opacity. If it has not fallen, it lowers the condenser/absorber set point another 5° F. as determined by the control valve, but no lower than the calculated minimum temperature.

If cooling further is determined, the microprocessor 17 causes a new condensation load by causing the temperature to be lowered.

Periodically, the microprocessor 17 determines if further cooling is possible. If it is, the microprocessor causes it to lower the condenser/absorber outlet temperature by increasing the cooling liquid flow rate. If a flow limit of the pump 16 is reached, the microprocessor so reports by sending a suitable message to the printer 17B, and cause the increase of the system differential pressure by increasing the speed of fan 15.

If initially it is found that the opacity is too low, the microprocessor 17 monitors the system differential pressure to see if it is above a desired pressure loss. If the system differential is too high, a signal is sent via the lead 405 to cause the lowering of the differential pressure in increments. The microprocessor 17 continues to monitor the opacity, causing it to be lowered to within the permitted set point limits. If the opacity is low, the microprocessor 17 attempts to cause the condenser/absorber temperature to be increased by decreasing the speed of the pump 16 and/or reducing the flow of water.

If the condenser/absorber temperature can be increased, the microprocessor 17 causes the set point to be raised in 5° F. increments as determined by the decremental speed changes of the pump 16 or closing the control valve, until the opacity changes to be within the desired limits. The microprocessor 17 then sends a report of the new condenser/absorber outlet temperature and the new scrubber differential to the memory 17A.

The microprocessor 17 periodically causes a summary of its adjustment activity to be printed by the printer 17B, to provide the initial parameters, the calculated target parameters, and the final actual system operating parameters, together with other desired information. The microprocessor then reports the cycle. In this manner, the condenser absorber 23 is adjusted initially, and the fan 15 is adjusted secondarily. The additional cooling by the condenser/absorber has multiple impacts on performance but is a variable defined by the differential in temperature between the normal saturation temperature and the set point determined by the microprocessor 17.

D. MICROPROCESSOR SOFTWARE

Figure 3:
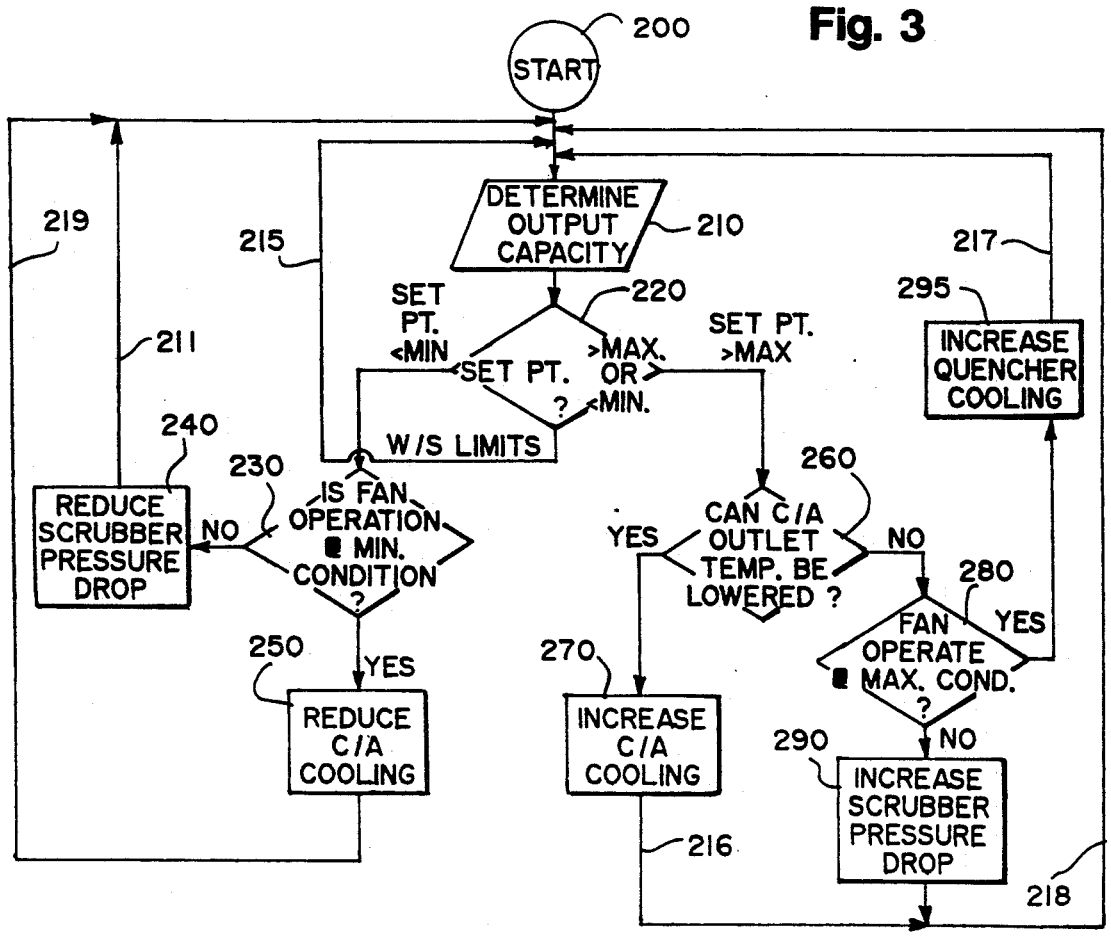
FIG. 3 is a flow chart diagram of the computer program of the microprocessor of the apparatus of FIG. 1.

Considering now the computer program software or firmware residing in the memory 17A of the microprocessor 17 with reference to FIG. 3, the light transmittance sensor 401 in the smoke stack 14 senses the light transmittance of the exhaust gas near the point at which the gas leaves the stack 14. As indicated in FIG. 3, there is shown the software control for the microprocessor 17 for determining whether an out of limit condition exists, and in controlling the operation of the system 10, in response to such an out of limit condition being determined. Starting at a START instruction 200, the microprocessor 17 first responds to the sensor 401 providing an opacity reading. Thereafter, at a decision box 220 where, if the reading is within the limits as shown in FIG. 2, there will be a return as indicated at 215 back to box 210 for subsequent readings to take place.

If, on the other hand, it is determined at the decision box 220 that the output opacity exceeds the maximum predetermined setpoint, the microprocessor 17 next establishes, at decision box 260, whether the condenser/absorber outlet temperature can be lowered.

If the decision is YES, as indicated at box 270, a signal is sent to the pump 16 to cause an incrementally increased amount of cooling water to be pumped to the condenser/absorber. As indicated at 216, thereafter, the microprocessor returns to instruction box 210. If, on the other hand, it is determined that the condenser/absorber temperature cannot be lowered, a determination is made at decision box 280 as to whether or not the fan pump 15 is operating at maximum capacity. If the decision is YES, then an emergency situation has occurred, and a signal is sent to the decision box 295 and from the microprocessor 17 via a lead to the valve 18 to cause an increase in the cooling liquid to flow to the quencher 22 in an attempt to return the opacity to be within limits. If the answer is NO a signal is sent to the decision box 290 to increase scrubber pressure drop. Thereafter, the microprocessor returns as indicated at return 217 to the instruction box 210 to further monitor opacity.

Increased cooling in the quencher 22 occurs when a signal from the microprocessor 17 is sent via the lead 407 to the valve 18 for increasing the flow of water through the line 193 into the nozzle 136. By so doing, the opacity, should be lowered to the maximum value of 10% of FIG. 2.

If the decision at box 280 is that the fan 15 is not operating at its maximum condition, a signal is sent from the microprocessor 17 via lead 405 to the fan 15 to increase the system pressure drop, in an attempt to decrease the opacity. Thereafter, the microprocessor returns as indicated at 218 to the instruction box 210.

When it is determined at decision box 220 that the set point is less than the minimum, a determination is made at decision box 230 whether the fan 15 is operating at its minimum condition. If the determination is YES, the condenser/absorber temperature is decreased incrementally at instruction box 250 by increasing the speed of pump 16. This is accomplished by a signal sent from the microprocessor 17 via lead 409. Thereafter, as indicated at 219 the microprocessor returns to the instruction box 210 to continue to monitor opacity.

If, on the other hand, it is determined at the decision box 230 that the fan 15 is not operating at its minimum operating condition, a signal is sent to the fan pump 15 to reduce the system pressure differential incrementally, as indicated at instruction box 240. Thereafter, the microprocessor returns as indicated at 211, to the instruction box 210 for further monitoring of opacity.

The operation continues in this manner to ensure that the opacity remains within the predetermined limits.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method for controlling unwanted constituent removal from a waste gas comprising:
   flowing a fluid containing the unwanted constituents;
   providing means for removing the unwanted constituents from the flowing fluid;
   sensing the amount of constituents being removed from the flowing fluid;
   responding to the sensing of the constituents for determining whether the amount of constituent removal is within a desired range of maximum and minimum limits;
   responding to the amount of constituents being substantially above said range and increasing the amount of constituents being removed;
   responding to the amount of constituents being substantially below said range and decreasing the amount of constituents being removed; and
   determining subsequently whether the amount of constituents is within said range.

2. A method of claim 1, including sensing the temperature of the flowing fluid.

3. A method of claim 1, including cooling the fluid.

4. A method of claim 1, wherein said sensing includes measuring light transmittance through said fluid.

5. A method of claim 1, wherein said sensing includes measuring the opacity of the fluid.

6. A method of claim 1, including forming condensation nuclei in the flowing fluid, wherein said nuclei contain unwanted constituents.

7. A method of claim 6, including spraying said fluid to scrub said condensation nuclei therefrom.

8. A method of claim 1, including collecting unwanted constituents from the flowing fluid by inertial impaction.

9. A method of claim 1, including flowing the treated fluid under pressure into the atmosphere.

10. A scrubbing system, comprising:
    means for flowing a fluid containing unwanted constituents;
    scrubbing means for removing at least some of said unwanted constituents from the flowing fluid;
    means for sensing the amount of constituents being removed from the flowing fluid;
    means responsive to the sensing of the constituents for determining whether the amount of constituent removal is within a desired range of maximum and minimum limits;
    means responsive to the amount of constituents being substantially above said range for increasing the amount of constituents being removed, said means for determining subsequently whether the amount of constituents is within said range; and
    means responsive to the amount of constituents being substantially below said range for decreasing the amount of constituents being removed, said means for determining subsequently whether the amount of constituents is within said range.

11. A scrubbing system of claim 10, wherein said sensing means includes means for measuring light transmittance through said fluid.

12. A scrubbing system of claim 10, wherein said means for determining includes a microprocessor.

13. A scrubbing system of claim 10, including means for cooling the fluid flowing to said scrubbing means.

14. A scrubbing system of claim 10, said system further including electrostatic precipitator means for treating the fluid flowing from said scrubbing means.

15. A scrubbing system of claim 10, said system further including means for forming condensation nuclei around the unwanted constituents before the fluid is flowed into said scrubbing means.

16. A scrubbing system of claim 10, said system further including inertial impaction means for collecting unwanted constituents from the fluid before it is flowed into said scrubbing means.

17. A scrubbing system of claim 10, wherein one of said unwanted constituents is an acid gas, said system further including a condenser/absorber for removing the acid gas before the fluid is flowed into said scrubbing means.

18. A scrubbing system of claim 17, said system further including means for providing water vapor for condensation scrubbing of said fluid before it is flowed into said scrubbing means.

19. A scrubbing system of claim 17, said system further including sweep diffusion means for removing unwanted constituents from the fluid before it is flowed into said scrubbing means.

20. A scrubbing system of claim 10, said system further including a collision scrubber.

21. A scrubbing system of claim 10, wherein water droplets are entrained in the fluid, said system further including an entrainment separator for removing water droplets from the fluid flowing from said scrubbing means.

22. A scrubbing system of claim 21, wherein said entrainment system includes an inlet baffle for removing entrained water droplets.

23. A scrubbing system of claim 10, said system further including compressor means for flowing a scrubbed fluid out of said system and into the atmosphere wherein said fluid is flowed from said scrubbing means.

* * * * *